Figure 7:
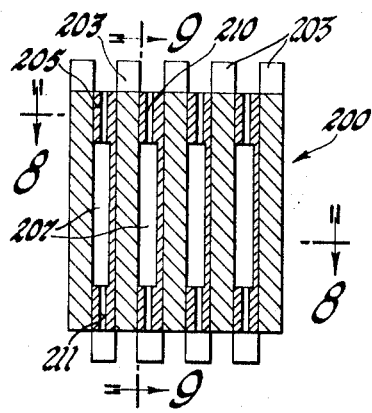

United States Patent

[11] 3,534,842

| [72] | Inventor | Ellard D. Davison, Jr.<br>Detroit, Michigan |
|---|---|---|
| [21] | Appl. No. | 785,028 |
| [22] | Filed | Dec. 9, 1968<br>Continuation of application Ser. No.<br>566,011, July 18, 1966, abandoned. |
| [45] | Patented | Oct. 20, 1970 |
| [73] | Assignee | General Motors Corporation<br>Detroit, Michigan<br>a corporation of Delaware |

[54] LUBRICATED FRICTION DEVICE
17 Claims, 11 Drawing Figs.

[52] U.S. Cl. ....................................................... 192/113,
192/107, 192/109, 188/264
[51] Int. Cl. ....................................................... F16d 13/72
[50] Field of Search ........................................... 192/10.12,
113.2, 109(F); 188/264.22

[56] References Cited
UNITED STATES PATENTS

| 2,150,950 | 3/1939 | Thoma | 192/113.2X |
|---|---|---|---|
| 2,690,248 | 9/1954 | McDowall | 192/113.2 |
| 2,844,230 | 7/1958 | Armstrong | 192/113.2X |
| 3,025,686 | 3/1962 | Lewis | 192/113.2X |
| 3,213,988 | 10/1965 | Maurice et al. | 192/113.2X |

FOREIGN PATENTS

| 742,120 | 12/1932 | France | 192/113.2 |
|---|---|---|---|
| 828,782 | 1/1952 | Germany | 192/113.2 |

*Primary Examiner*—Benjamin W. Wyche, III
*Attorneys*—Charles R. White, E. W. Christen and A. M. Heiter

ABSTRACT: A fluid lubricated friction unit having friction plates which are movable between a first position in which the plates are relatively rotatable and a second position in which the plates are frictionally engaged and locked. Selected plates are provided with open faced, fluid receiving pockets and pocket bleeds permitting a pressure buildup of the lubricating fluid in the area of the pockets and a subsequent graduated decay of this pressure to calibrate the engagement of the friction members.

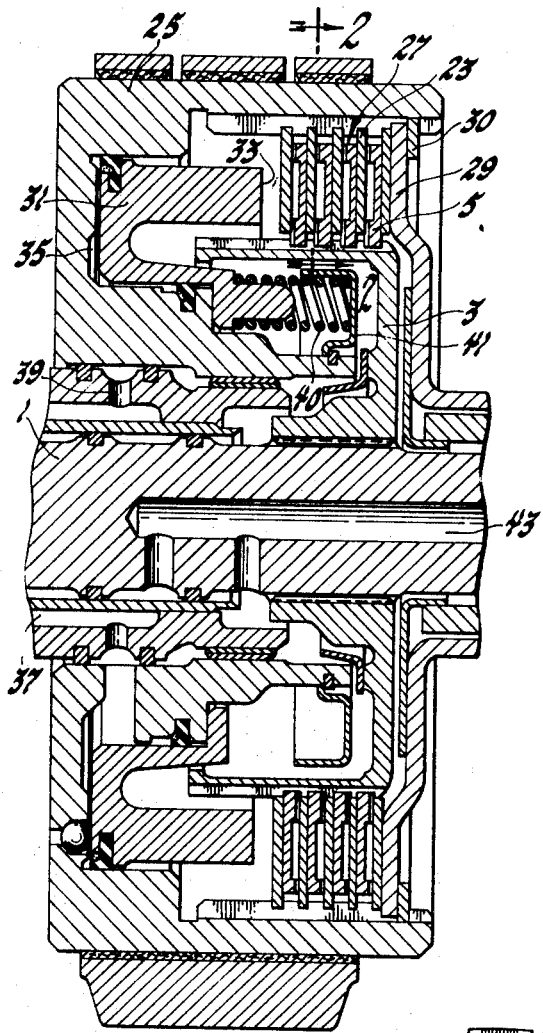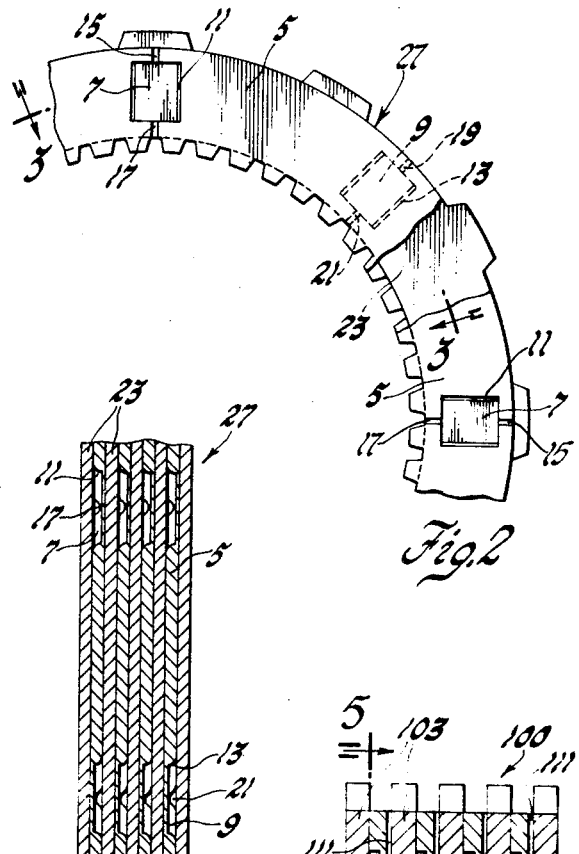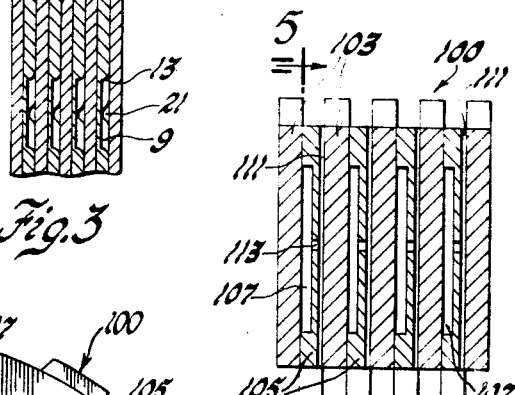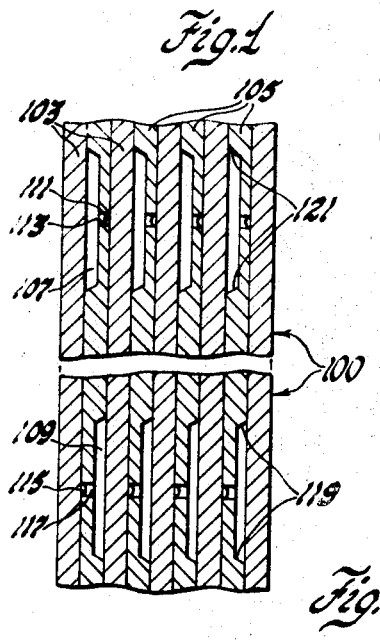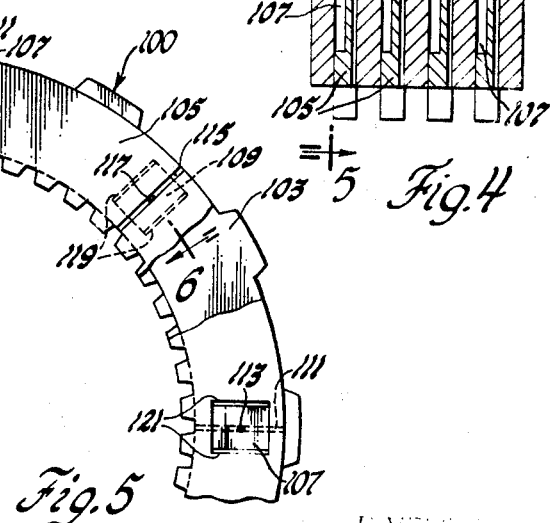

Patented Oct. 20, 1970  3,534,842

INVENTOR.
Ellard D. Davison Jr.
BY
Charles R. White
ATTORNEY

LUBRICATED FRICTION DEVICE

This application is a continuation of my copending U.S. Pat. application Ser. No. 566,011 titled Lubricated Friction Device filed July 18, 1966 and now abandoned.

This invention relates to fluid-lubricated friction devices including selectively engageable friction members having recesses and bleeds with the recesses providing smooth engagement and the bleeds providing control over friction device engagement time.

In general, presently used friction units, such as lubricated, selectively engageable, multiplate clutches or brakes, have a first set of plates splined to a first torque transmitting member and a second set of plates interleaved with the first set and splined to a second torque receiving member. The second plates usually have specially prepared frictional surfaces, such as a cellulosic composition, which form the frictional faces of these plates. As the first and second plates are brought into engagement with each other, the heat of friction frequently damages both sets of plates, particularly the composition-faced plates, causing glazing, burning and flaking thereof. Obviously, such damaged plates have marginal performance and poor durability. Attempts to use all metallic friction plates including sintered plates in such devices to improve performance and durability have met with only limited success since the heat generated during engagement of such plates sometimes caused warping, resultant metal transfer and other damage thereto.

This invention provides means for controlling the time of engagement of the friction plates of clutch or brake units which can be used in units having all metal plates or units having plates with special friction facing materials. In accordance with this invention certain friction members are provided with lubricant-receiving recesses that collect lubricant during engagement of the plates. Pressure buildup created by use of these recesses cushions engagement. Calibrated bleed means are provided to time the engagement by relieving lubricant from the recesses in a controlled manner.

An object of this invention is to provide fluid-lubricated friction members fashioned with fluid receiving pockets and pocket bleeds to effect a pressure buildup in the general area of the pockets and a subsequent decay in this pressure to calibrate the engagement of the friction members.

Another object of this invention is to provide a first friction member for use in a fluid-lubricated friction unit that is selectively engageable with a second member; the first member having lubricant-receiving recess means for decreasing the fluid-friction member coefficient of friction during engagement and further having provision for controlled bleed of the lubricant from the recess means during engagement to obtain full engagement of the members.

Another object of this invention is to provide a lubricated friction device having a first friction member connected to a movable input, which member is selectively engageable with a second friction member connected to torque-receiving structure; at least one of the members having lubricant-receiving recess means improving friction member durability with each recess means having a bleed for conducting lubricant therefrom during engagement of the two members enabling the members to be fully engaged.

Another object of this invention is to provide a friction unit having first and second selectively-engageable friction members in which there is time control of the engagement of the members providing for smooth engagement of the members and improved durability of the members.

Another object of this invention is to provide a lubricated friction device having selectively-engageable and relatively-slidable friction members including structure to control the lubricant-friction member coefficient of friction and to control bleed of the lubricant from the members to: (1) increase durability of the friction members and service life of the friction unit, (2) provide smooth sliding of the friction members, (3) provide a means of control over the period of slippage between the members, and (4) minimize noise and chatter during relative sliding between the members.

Another object of this invention is to provide an improved, highly durable friction unit including an all metallic, torque-transmitting first friction member selectively engageable with an all metallic, torque-receiving second friction member.

Another object of this invention is to provide a friction unit having both a torque-transmitting and a torque-receiving member; at least one of the members providing improved fluid-cushioning structure and at least one of the members being of porous metal having a predetermined porosity for controlled bleed of the lubricant to control friction member engagement.

Figure 8:
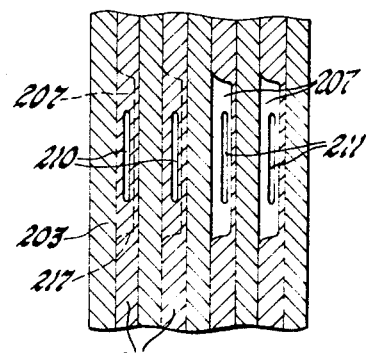
Figure 9:
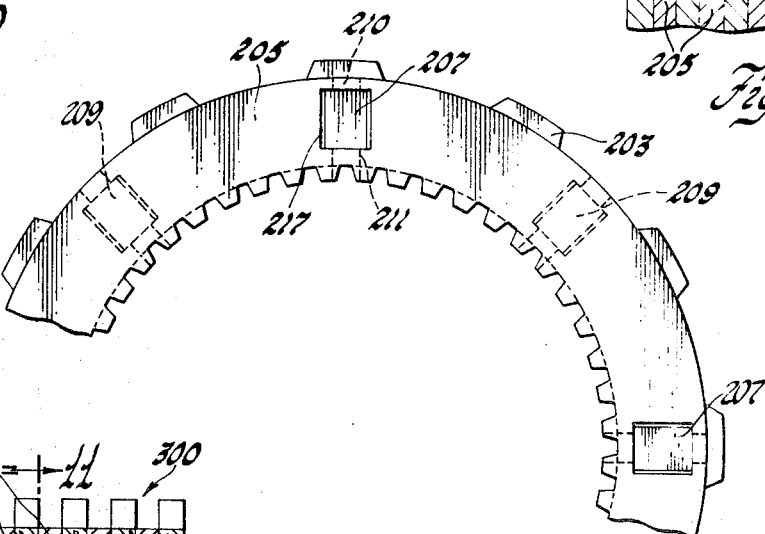
Figure 10:
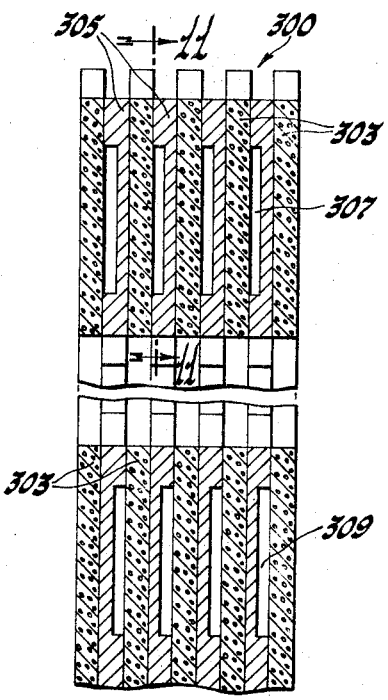
Figure 11:
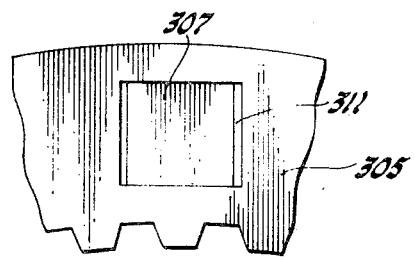

These and other objects of this invention will become more apparent from the following detailed description and drawings in which:

FIG. 1 is a sectional view of a portion of a friction unit;
FIG. 2 is a view taken along the line 2–2 of FIG. 1;
FIG. 3 is a sectional view taken along the line 3–3 of FIG. 2;
FIG. 4 is a sectional view of a second embodiment of the invention;
FIG. 5 is a view taken along line 5–5 of FIG. 4;
FIG. 6 is a sectional view taken along line 6–6 of FIG. 5;
FIG. 7 is a sectional view illustrating a third embodiment of the invention;
FIG. 8 is a view taken along line 8–8 of FIG. 7;
FIG. 9 is a view taken along line 9–9 of FIG. 7;
FIG. 10 is a sectional view illustrating a fourth embodiment of the invention; and
FIG. 11 is a view taken along line 11–11 of FIG. 10.

Referring to the drawings, and particularly to FIG. 1, there is a rotatable input shaft 1 to which is splined an annular hub 3. The outer periphery of this hub is splined to support a plurality of flat, internally splined drive plates 5. These drive plates are preferably of a suitable metal such as metallic-coated or plated steel. As best shown in FIG. 2, these plates are formed with a series of equally spaced, rectilinear, hydraulically separated, recesses 7 and 9 formed within the edges of opposite faces thereof and the open sides facing opposing faces on the adjacent plates forming a fluid receiving pocket. As shown in FIGS. 2 and 3, the forward and trailing edges of each of these recesses are radiused or beveled as at 11 and 13.

Leading from these recesses are bleed grooves shown as grooves 15 and 17 extending from the recesses 7 and as grooves 19 and 21 extending from recesses 9.

Interleaved with plates 5 are a series of driven plates 23 externally splined to an output drum 25. These driven plates are also flat and are preferably made of metal such as steel and may be, if desired, metal coated or plated. The interleaved plates form a friction plate pack 27 backed by a circular backing plate 29 that is splined to the drum 25 and secured thereto by a retainer ring 30. An apply piston 31 is movably mounted within the drum 25 and has an apply face 33. The piston and the drum form a pressure chamber 35 which is connected by passages 37 and 39 to a pressure source, not shown. Suitable coil springs 40 for piston return are seated between the inner face of the piston and an annular spring support 41. Passage 43 leading from a pressurized source of lubricating and cooling fluid is provided to conduct such fluid into the interior of the drum 25 to lubricate and cool the friction plates and other moving parts of the friction unit.

To engage the friction plate pack, apply pressure is admitted to chamber 35. The piston will longitudinally move to engage the first driven plate, pushing the plates together against the backing member 29 to obtain lockup so that full torque may be transmitted from the drive plates to the driven plates.

With this invention, substantially improved operation of friction devices is obtained, time of engagement is closely controlled, smooth engagement may be achieved and noise and chatter is minimized. Also improved cooling and lubricating is obtained. While the bleeds are shown leading both radially inwardly and outwardly, it will be appreciated that they may be formed so that they lead only inwardly or outwardly. It will be also appreciated that the recesses and bleeds may be provided on the driven plate instead of the drive plate if so desired.

Furthermore, these recesses and bleeds may be used on all of the plates.

To provide the improved results stated above, the invention is believed to operate as follows. In all lubricated friction devices, when rotating plates are squeezed together and the lubricant is being exhausted from the diminishing space between the plates, there is a buildup of lubricant pressure or squeeze film between the plates which is load carrying and which provides some cushioning of friction plates being engaged. The use of recesses or pockets supplements this above mentioned pressure buildup by causing a hydrodynamic lubricant film of load-carrying capacity to form in the general area of the recesses. When there is relative rotary motion between adjacent plates, the resulting movement of lubricant to end through the recesses provides a wedging effect to promote this hydrodynamic lubricant film pressure buildup, thus reducing the lubricant plate coefficient of friction. The use of radius or bevel on the forward and trailing edge of each recess facilitates the development of this load-carrying hydrodynamic fluid film. One of the beveled edges provides for easy entrance of fluid into the recess while the other beveled edge tends to direct the fluid against the plate facing the recess for increasing the pressure and thus the load-carrying capacity and cushioning qualities of the lubricant.

In this invention bleeds or restricted passages only for exhaust are provided in the plate for each of the recesses so that the cooling and lubricating fluid can circulate and there will be little or no trapped fluid in the recesses to prevent a positive lock-up of the friction plates. Without bleeds the oil pressure buildup in the pockets would inhibit or excessively delay a lock-up condition and allow the friction plates to slip for an excessive time causing overheating. The sizing of the bleeds controls timing of engagement of the friction members. Enlarging the bleeds increases the lubricant-plate coefficient of friction, thus reducing time of engagement, while reducing the size of the bleeds reduces the lubricant-plate coefficient of friction, thus increasing engagement time.

Summarizing the above, during engagement of the rotating plates, some fluid between the plates moves relative to the plates with recesses and easily or without restriction, because of the large open-face entryway, enters the recesses and on exit is directed against the adjacent plate to provide a wedging effect. This builds up an increased pressure since the entry flow is larger than the bleed or exhaust flow of the load carrying film in the recess and a general area adjacent the recesses. The recesses only have smaller exhaust or bleed passages to only exhaust fluid from the recesses to gradually relieve this pressure by exhausting fluid at a slower controlled rate to delay engagement.

The other illustrated embodiments of this invention work in a similar manner and are hereinafter described.

The second embodiment is illustrated in FIGS. 4—6. These figures disclose a friction plate pack 100 corresponding to the friction pack 27 of FIGS. 1 and 3, and include flat driven plates 103 and flat drive plates 105. The friction surfaces of the driven plates 103 are planar while those of the drive plates have a plurality of spaced recesses 107 and 109 respectively which provide pockets for receiving the lubricating and cooling fluid. As in the first embodiment, the sides of each recess are either beveled or radiused at 119 and 121. Each recess 107 communicates with a respective groove 111 formed radially in the surface opposite to the surface in which the recess is formed. The recess communicates with this groove through a bleed orifice 113. In a similar manner each recess 109 communicates with a corresponding groove 115 through a bleed orifice 117. Preferably the grooves extend from the inner to the outer periphery of each plate although they may extend only from the bleed orifice to either the inner or the outer periphery if desired. As in the first embodiment, the recesses with bleeds may be used on the driven plates instead of the drive plate, or if desired, the recesses with bleeds may be used on both the drive and driven plates.

Another embodiment of the invention is illustrated in FIGS. 7, 8 and 9. In this embodiment, friction pack 200 has driven plates 203 which are flat and have continuous surfaces while each of the drive plates 205 are flat but have spaced recesses 207 and 209 providing lubricant-receiving pockets. The recesses are preferably beveled at 217 as shown in FIG. 8. Radially extending passages or slots 210 and 211, communicating with these recesses, are entirely formed in the material of the drive plates and have predetermined capacity for control bleed of the lubricating and cooling fluid. The passage for each recess may lead only inwardly or outwardly, instead of both inwardly and outwardly. Furthermore, the recesses with bleeds may be used on the driven plates instead of the drive plates or, if desired, the recesses with bleeds may be used on both the drive and driven plates.

In another embodiment illustrated best by FIG. 10 there is shown a friction plate pack 300 formed by a plurality of flat, porous metal driven plates 303 and interleaved drive flat, substantially nonporous plates 305 which may be steel. As in the previous embodiments the drive plates have recesses 307 and 309 on opposite sides thereof. The leading edges of these recesses are radiused or beveled at 311.

FIG. 11 shows one of the recesses 307 and it will be seen that there is no bleed groove or opening in this drive plate as in the previous embodiments.

The porosity of the metal driven plates is closely controlled and serves as a restriction to provide for controlled bleeding of the fluid collected in the pockets during clutch apply. The porous metal plates may be made in any suitable manner. For example, powdered metal such as copper, iron or nickel is mixed with foamed plastic and then sintered. The porosity of such plates being controlled during manufacture eliminates the need for the special bleed grooves or orifices.

As the friction pack is engaged, fluid collected in the recesses during engagement will be bled through the material of the porous plates in a controlled manner to provide for controlled engagement of the friction pack. This prevents the scoring or welding of the plates, times the period of engagement and reduces noises.

From the above it will be apparent than many different combinations may be made utilizing plates of porous materials. For example, the porous plates 303 may be used as drive plates and the nonporous plates 305 may be used as the driven plates. Also the porous plates may be recessed to receive the lubricant while the nonporous plates may have continuous friction surfaces. However, both drive and driven plates may be recessed to achieve a particular result such as faster engagement time. Also both drive and driven plates may be of porous material and recessed in any desired manner.

From the above it will be appreciated that this invention affords a wide choice in materials used for friction plates in clutches and brakes. Thus highly durable solid steel or other suitable metals may be successfully employed or foamed metal or other porous materials may be used without excessive wear. Furthermore, plates employing currently used composition facings will provide improved performance and durability.

It will be understood that the above illustrated and described embodiments are but examples of particular forms of the invention and it will be appreciated that this invention is not to be restricted by any of these particular forms, but only by the claims which follow hereinafter.

I claim:
1. A friction torque transmitting device having a plurality of relatively rotatable friction members selectively engageable to provide a torque drive therebetween, each of said members having an annular friction surface facing and engageable with another annular friction surface on another member, means for relatively moving said members between a first position in which said facing friction surfaces are separated to have a space therebetween to disengage the drive between said members and a second position in which said friction surfaces are fully frictionally engaged to provide a full torque transmitting drive between the members without slip, means to supply fluid to the space between the friction surfaces of said members in said first position, said members having engagement control means including recess means in the friction surface of a first of said members and substantially entirely within the edges of the friction surface of a first of said members having an open face area substantially completely facing the friction surface of the second of said members to provide pocket means between said friction surfaces of said members to receive and collect a substantial volume of annularly inflowing fluid from the space between the surfaces in response to relative rotation of said members in said first position and during movement toward said second position and to confine fluid under pressure in said pocket means as the members move toward said second position to delay engagement of said members, exhaust means providing the only fluid exhaust path from said pocket means to exhaust externally of said members for controlling the exhaust of the fluid from said pocket means to control the rate of increase of torque transmitted during engagement, said exhaust means only being provided by the space between the friction faces which forms a reducing exhaust from said pocket means during movement of said members from said first toward said second position that substantially closes in said second position and by only restricted bleed exhaust path means connecting said pocket means through a member to exhaust externally of said members having a flow capacity less than said inflowing fluid flow for only restricted exhaust flow as the members move toward said second position to restrict the exhaust flow of the fluid from said pocket means to cause said inflowing fluid flow to build up fluid pressure between said members in the area of said pocket means in response to relative rotary movement of said members during movement from said first position toward said second position and to gradually only restrictively exhaust fluid from said pocket means for a timed decay of said pressure buildup in said pocket means for controlling a timed delay engagement from said first disengaged position to said second position for full torque transmittal.

2. The friction device of claim 1, said recess means having an open face which extends across a major portion of said friction surface of said one member.

3. A friction torque transmitting device having a plurality of relatively rotatable friction members selectively engageable to provide a torque drive therebetween, each of said members having an annular friction surface facing another annular friction surface on another member, means for relatively moving said members between a first position in which said facing friction surfaces are separated to have a space therebetween to disengage the drive between said members and a second position in which said friction surfaces are fully frictionally engaged to provide a full torque transmitting drive between the members without slip, means to supply fluid to the space between the friction surfaces of said members in said first position, said members having engagement control means including recess means in and substantially entirely within the edges of the friction surface of a first of said members having an open face area substantially completely facing the friction surface of a second of said members to provide pocket means between said members to receive and collect annularly inflowing fluid from the space between the surfaces in response to relative rotation of said members in said first position and during movement toward said second position and to confine fluid under pressure therein as the members move toward said second position, said recess means having spaced inflowing and outflowing edges at the friction surface transversely disposed with respect to the direction of relative movement of said members and at least one of said edges being tapered for directing the annular flow of said lubricating fluid into said recess means, exhaust means providing the only fluid passages from said pocket means to exhaust externally of said members for controlling the exhaust of the fluid from said pocket means to control the rate of increase of torque transmitted, said exhaust means only being provided by the space between the friction faces which forms a reducing exhaust from said pocket means during movement of said members from said first toward said second position that substantially closes in said second position and by only restricted bleed exhaust passage means connecting said pocket means through a member to exhaust externally of said members having a flow capacity less than said inflowing fluid flow for only exhaust flow as the members move toward said second position to restrict the exhaust of the fluid from said pocket means to cause said inflowing fluid flow to build up fluid pressure between said members in the area of said pocket means in response to relative rotary movement of said members during movement from said first position toward said second position and to gradually only exhaust fluid from said pocket means for a timed decay of said pressure buildup in said pocket means for controlling the time required to relatively move said members from said first to said second position for full torque transmittal.

4. A friction device having a plurality of relatively rotatable friction members, each of said members having an annular friction surface aligned with and facing another annular friction surface on another member, motor means for relatively moving said members between a first position in which said facing friction surfaces are separated to have a space therebetween to disengage the drive between said members and a second position in which said friction surfaces are fully frictionally engaged to provide a full torque transmitting drive between the members without slip, means to supply liquid to the space between the facing friction surfaces of said members, said members having engagement control means including liquid confining recess means formed in said friction surface of one of said members and located substantially within the edges of said one member and facing said friction surface of another of said members to provide pocket means to receive and collect inflowing liquid flow in response to relative rotation of said members and to confine and build up the pressure of liquid therein and including exhaust means providing the only liquid communication from said pocket means to exhaust externally of said pocket members for controlling the exhaust from said pocket means to control the rate of increase of torque transmitted, said exhaust means only including the space between the friction surfaces which forms an exhaust from said pocket means during movement of said members from said first position toward said second position that substantially closes in said second position and restricting bleed exhaust means formed directly in one of said friction members and extending from said pocket means through a member to exhaust externally of said members for providing a calibrated liquid bleed only for exhaust from said pocket means when there is a pressure buildup in said recess means, and said exhaust means being operative for increasingly restricting the exhaust of liquid from said pocket means to cause said inflowing liquid flow to build up a controlled fluid pressure between said members in the area of said pocket means in response to relative rotary movement of said members and movement of said members from said first toward said second position for controlling the rate of exhaust flow to control the pressure to gradually increase the torque transmitted and to provide an exhaust bleed in said second position to permit a timed decay of said pressure buildup in said pocket means for timed full engagement and full torque transmittal of said friction members.

5. The friction device of claim 4 wherein said bleed exhaust means is a groove formed in the friction surface of said one member which extends from said recess means across and entirely through the friction surface of said one member.

6. The friction device of claim 4 wherein said recess means has spaced edge portions transverse with respect to the friction surface of said one member.

7. In a friction device having a plurality of relatively rotatable friction plates, each of said plates having a friction surface aligned with and facing a friction surface on another plate, means for relatively moving said plates between a laterally separated first position in which the facing friction surfaces of said plates define a space therebetween and in which said plates are relatively rotatable, and a second position in which said friction surfaces are fully engaged without a space therebetween and are frictionally locked together, means to supply a liquid to said space between said facing friction surfaces, at least one of said plates having enlarged open pocket means having an open face in the friction surface and being surrounded by the friction surface thereof and having a bottom formed by an integral portion of said last mentioned plate and facing the friction surface on the other plate and further having a fluid capacity sufficient to allow the buildup of liquid pressure in the area of said pocket means as said plates relatively rotate and move toward the second position causing liquid to flow into said pocket means, bleed means formed through at least one of said plates to exhaust providing the only liquid communication through said plates between said pocket means and exhaust and having a fluid capacity sufficiently small in relation to the flow of fluid into said pocket means and the capacity of said pocket means to only accomodate limited exhaust flow to initially cause the pressure buildup in the area of said pocket means and to subsequently relieve said pressure buildup in a controlled manner as said friction surfaces closely approach engagement by gradually exhausting the liquid therefrom to time and control the full engagement of said friction surfaces.

8. The friction device of claim 7, said pocket means which extends across a major portion of said friction surface in one of said plates and another of said plates being of a material having a predetermined porosity to provide said bleed means.

9. A fluid lubricated friction device comprising a housing, and first and second relatively slidable friction members in said housing each having inner and outer peripheral edges and a friction surface aligned with and facing a friction surface on another member, motor means for relatively moving said members between a first position in which said facing friction surfaces have a space therebetween and are completely disengaged and a second position in which said surfaces are fully engaged and frictionally coupled to prevent the relative sliding thereof, means to supply fluid to said housing and the space between said members, enlarged recess means in at least said first member having an open face in the friction surface and within the edges thereof and directly facing the other friction surface for receiving said fluid moved by the relative sliding of said members to provide a localized buildup of fluid pressure in the general area of said pockets and thereby cushion the engagement of said friction means, calibrated fluid-exhaust means formed in said first member leading from said recess means through said inner peripheral edge of said first member for providing fluid communication between said recess means and the interior of said housing and for exhaust bleeding of fluid from said recess means, said fluid-exhaust means having a fluid-conducting capacity sufficiently small to cause said recess means to build up said fluid pressure while exhausting limited quantities of the fluid therefrom as said friction surfaces are being engaged to permit said surfaces to be fully engaged and to control the time period for moving said members from said first position to said second position.

10. The friction device of claim 9 wherein said recess means are a plurality of open-face pockets formed in said first member which are oriented toward the friction face of said second member, and said fluid-exhaust means being separate and distinct passages in said first member for each of said pockets.

11. The friction device of claim 9 wherein said recess means have spaced edge portions transverse of the friction surface of said one of said members to direct fluid into and out of said recess means to promote the localized buildup of lubricant pressure in the general area of said pockets.

12. In a lubricated friction device having first and second friction members disposed in a liquid lubricant, said friction members having friction surfaces which face each other, drive means for rotating said first friction member with respect to said second friction member, means for relatively moving said friction members from a first position in which said friction surfaces have a space therebetween and are frictionally disengaged to a second position in which said friction surfaces are engaged and locked up, said device having a lubricating fluid in said space, one of said surfaces having an open face pocket means within its edges facing the other surface, said pocket means having dimensions for receiving sufficient quantities of said fluid in said space moved by relative rotation of said members as said members relatively move toward said second position to cause a local increase of fluid pressure in the general area of said pocket for retarding the engagement of said friction surfaces, said pocket means having an inclined side edge to facilitate the flow of fluid into said pocket means from the space between said friction surfaces, restricted bleed means extending from said pocket through the inner peripheral edge of the first of said friction members, said restricted bleed means being a fluid-exhaust groove in said friction surface having said pocket, said groove having a fluid capacity to exhaust predetermined quantities of fluid from said pocket and gradually reduce the local increase of fluid pressure as said members are relatively moved to said second position to delay and time the engagement of said friction surfaces, and said pockets having an inclined side edge to facilitate the flow of fluid into said pocket.

13. The friction device defined in claim 12 wherein said exhaust means is a calibrated groove in said surface having said pocket, said groove having a fluid capacity to exhaust only predetermined quantities of fluid from said pocket as said members are relatively moved to said second position to time the engagement of said friction surfaces.

14. The friction device defined in claim 12 wherein at least one of said friction members is made of a porous friction material having a predetermined porosity to provide said bleed means.

15. The friction device defined in claim 13 wherein said bleed means is a straight passage formed in said friction surface having said pocket, said passage communicating with said pocket for exhausting fluid therefrom to calibrate the engagement of said friction surfaces.

16. In a friction device having a housing, a plurality of relatively rotatable friction plates disposed in said housing, each of said plates having a friction surface, said plates being relatively movable between a laterally separated position in which said plates are relatively rotatable and another position in which said friction surfaces are fully engaged, said plates being frictionally locked together in said second position, a lubricating liquid in said housing, at least a first of said plates having only enlarged open pocket means in the friction surface thereof and liquid-exhaust bleed groove means extending in the friction surface of said first plate from said pocket means through the edge of said first plate to provide a flow path for said lubricating liquid directly from the space between said friction surfaces into said pocket means and from said pocket means through said bleed groove means and the edge of said first plate into areas of said housing adjacent to said friction surfaces, said pocket means having a fluid capacity sufficient to allow the buildup of lubricating liquid pressure in the area of said pocket means as said plates relatively rotate and move toward the second mentioned position, said bleed means having a fluid capacity sufficiently small in relation to the capacity of said pocket to initially permit pressure buildup in the area of said pocket means and subsequently to gradually release said pressure in a controlled manner to time the engagement of said friction plates by exhausting the liquid therefrom to permit said friction surfaces to be fully engaged.

17. In a friction device having a plurality of relatively rotatable friction plates, each of said plates having a friction surface facing a friction surface on another plate, means for relatively moving said plates between a laterally separated first position in which the facing friction surfaces of said plates define a space therebetween and in which said plates are relatively rotatable, and a second position in which said friction surfaces are fully engaged without a space therebetween and are frictionally locked together, means to supply a liquid to said space between said facing friction surfaces, at least one of said plates having enlarged open pocket means having an open side in the friction surface and being surrounded by the friction surface thereof and facing the friction surface on the other plate and having a fluid capacity sufficient to allow the buildup of liquid pressure in the area of said pocket means as said plates relatively rotate and move toward the second position causing liquid to flow into said pocket means, bleed means formed through at least one of said plates to exhaust providing the only liquid communication through said plates between said pocket means and exhaust and having a fluid capacity sufficiently small in relation to the flow of fluid into said pocket means and the capacity of said pocket means to only accommodate limited exhaust flow to initially cause the pressure buildup in the area of said pocket means and to subsequently relieve said pressure buildup in a controlled manner as said friction surfaces closely approach engagement by gradually exhausting the liquid therefrom to control full engagement of said friction surfaces, said pocket means having spaced edges which extend transversely across a major portion of said friction surface in said one of said plates, and said bleed means comprising a fluid-exhaust groove formed in said last mentioned friction surface which communicates with said pocket means and which extends inwardly from said pocket means through an inner peripheral edge of said last mentioned plate.